US012797875B2

(12) United States Patent
Roman

(10) Patent No.: US 12,797,875 B2
(45) Date of Patent: Nov. 17, 2026

(54) TRANSPORT SYSTEM FOR PAINT SPRAYER AND PAINT BUCKET

(71) Applicant: Robert Roman, Las Vegas, NV (US)

(72) Inventor: Robert Roman, Las Vegas, NV (US)

( * ) Notice: Subject to any disclaimer, the term of this patent is extended or adjusted under 35 U.S.C. 154(b) by 186 days.

(21) Appl. No.: 18/645,067

(22) Filed: Apr. 24, 2024

(65) Prior Publication Data

US 2025/0332602 A1 Oct. 30, 2025

(51) Int. Cl.
*B05B 7/00* (2006.01)
*B44D 3/12* (2006.01)
*B62B 1/26* (2006.01)

(52) U.S. Cl.
CPC .............. *B05B 7/0093* (2013.01); *B44D 3/12* (2013.01); *B62B 1/264* (2013.01); *B62B 2202/028* (2013.01)

(58) Field of Classification Search
CPC ......... B05B 7/0093; B44D 3/12; B62B 1/264; B62B 2202/028; B62B 2207/00; B62B 2207/02
See application file for complete search history.

(56) References Cited

U.S. PATENT DOCUMENTS 6,293,273 B1 * 9/2001 Byrne ..................... F24C 15/18 126/41 R
2021/0078049 A1 * 3/2021 Nushart .................. E01H 1/101

* cited by examiner

*Primary Examiner* — Steven M Sutherland
(74) *Attorney, Agent, or Firm* — FisherBroyles, LLP; Rob L. Phillips

(57) ABSTRACT

A system involves a wheeled paint sprayer, 5-gallon paint bucket, a bucket transport apparatus and strap. More specifically, the bucket transport apparatus may be a dolly-type apparatus with the strap configured to removably attach the paint sprayer to the dolly-type apparatus. In this manner, the dolly-type apparatus supports the paint bucket and when tilted rearward about its wheels, the strap raises a front portion of the paint sprayer such that the dolly-like apparatus can be used to move the paint sprayer and paint bucket collectively. The bucket transport apparatus may include over-sized wheels to render it more stable and mobile at construction sites.

22 Claims, 13 Drawing Sheets

TRANSPORT SYSTEM FOR PAINT SPRAYER AND PAINT BUCKET

FIELD OF THE INVENTION

The embodiments of the present invention relate to a dolly-like transport system for moving a paint sprayer and paint bucket.

BACKGROUND

Commercial paint sprayers are configured to remove paint from 5 gallon buckets using pumps and hoses. Paint sprayers usually include a pair of wheels for mobility. Paint sprayers are typically moved separately from the 5 gallon paint buckets from which the paint is being removed by the paint sprayer.

It would be advantageous to develop a system to move the paint sprayer and paint bucket simultaneously.

SUMMARY

The embodiments of the present invention broadly involves a wheeled paint sprayer, 5-gallon paint bucket, a bucket transport apparatus and strap. More specifically, in one embodiment, the bucket transport apparatus is a dolly-type apparatus. In one embodiment, the strap is used to removably attach the paint sprayer to the dolly-type apparatus. In this manner, the dolly-type apparatus supports the paint bucket and when tilted rearward, the strap raises a front portion of the paint sprayer such that the dolly-like apparatus can be used to move the paint sprayer and paint bucket collectively. In one embodiment, the bucket transport apparatus includes over-sized wheels to render it more stable and mobile at construction sites.

In one embodiment, the strap attaches to an upper portion of the bucket transport apparatus and an undercarriage of the wheeled paint sprayer. In this configuration, when the bucket transport apparatus is tilted rearward to lift the bucket, the strap lifts the front of the wheeled paint sprayer such that both the bucket transport apparatus and wheeled paint sprayer are balanced on their respective wheels. The user may then push or pull the wheeled paint sprayer using the bucket transport apparatus. In other embodiments, the strap may be replaced with a rope, cable, belt, etc.

In one embodiment, the strap is tied to the bucket transport apparatus and wheeled paint sprayer. In alternative embodiments, the strap incudes connection devices at opposite ends thereof which are configured to attach to the bucket transport apparatus and wheeled paint sprayer. In another embodiment, the strap includes one or more ratchets for adjusting the length and tension of the strap.

Other variations, embodiments and features of the present invention will become evident from the following detailed description, drawings and claims.

DETAILED DESCRIPTION

Figure 1:
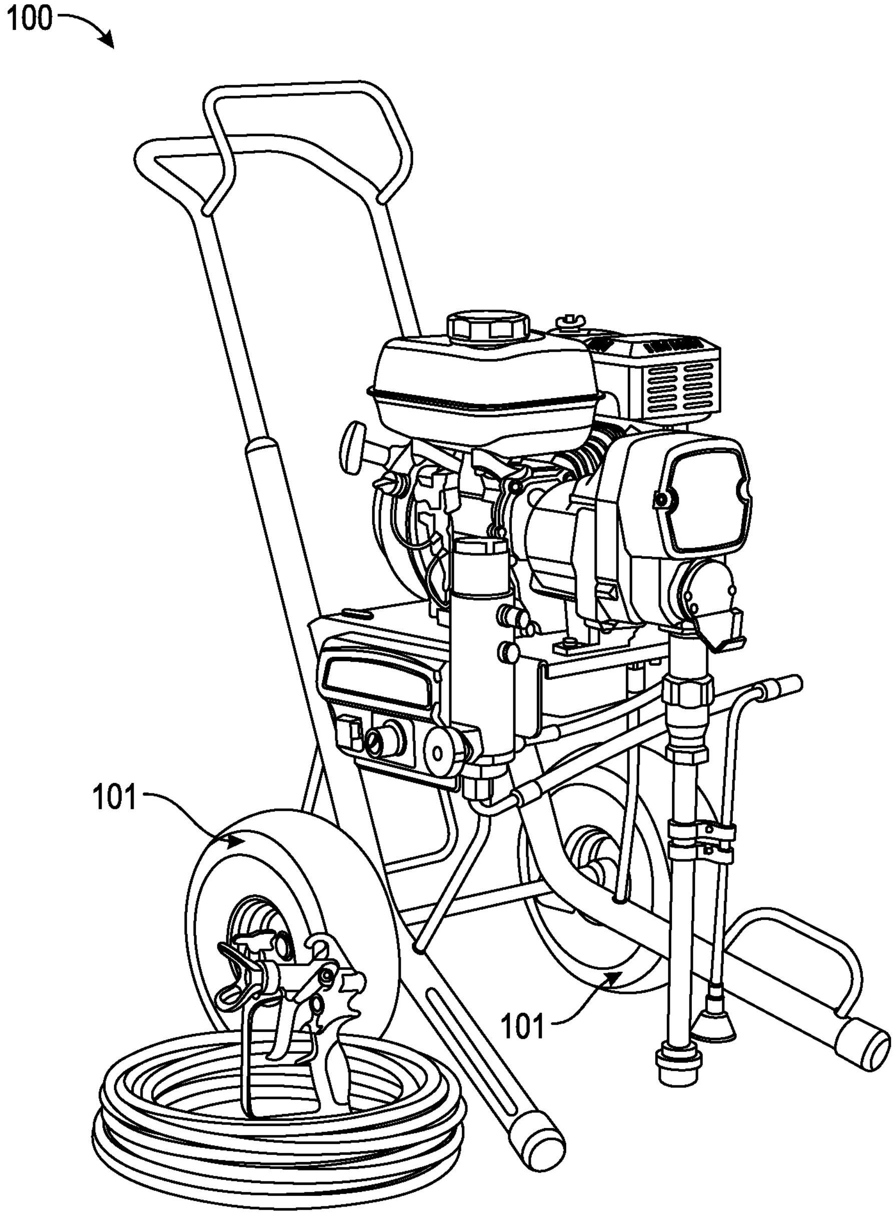
FIG. 1 illustrates a first prior art commercial paint sprayer with wheels.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the components described herein may be fabricated using any known techniques and may be fabricated of any available materials suitable for the desired task. Those skilled in the art will recognize that the water and paint separation system may be fabricated using off-the-shelf parts available at most hardware stores. In one embodiment, the parts and components necessary to fabricate the water and paint separation system are sold as a kit. In other embodiments, the water and paint separation system may be purchased in assembled form whereby a manufacturer uses customized parts or a combination of customized parts and off-the-shelf parts to fabricate the same.

Figure 2:
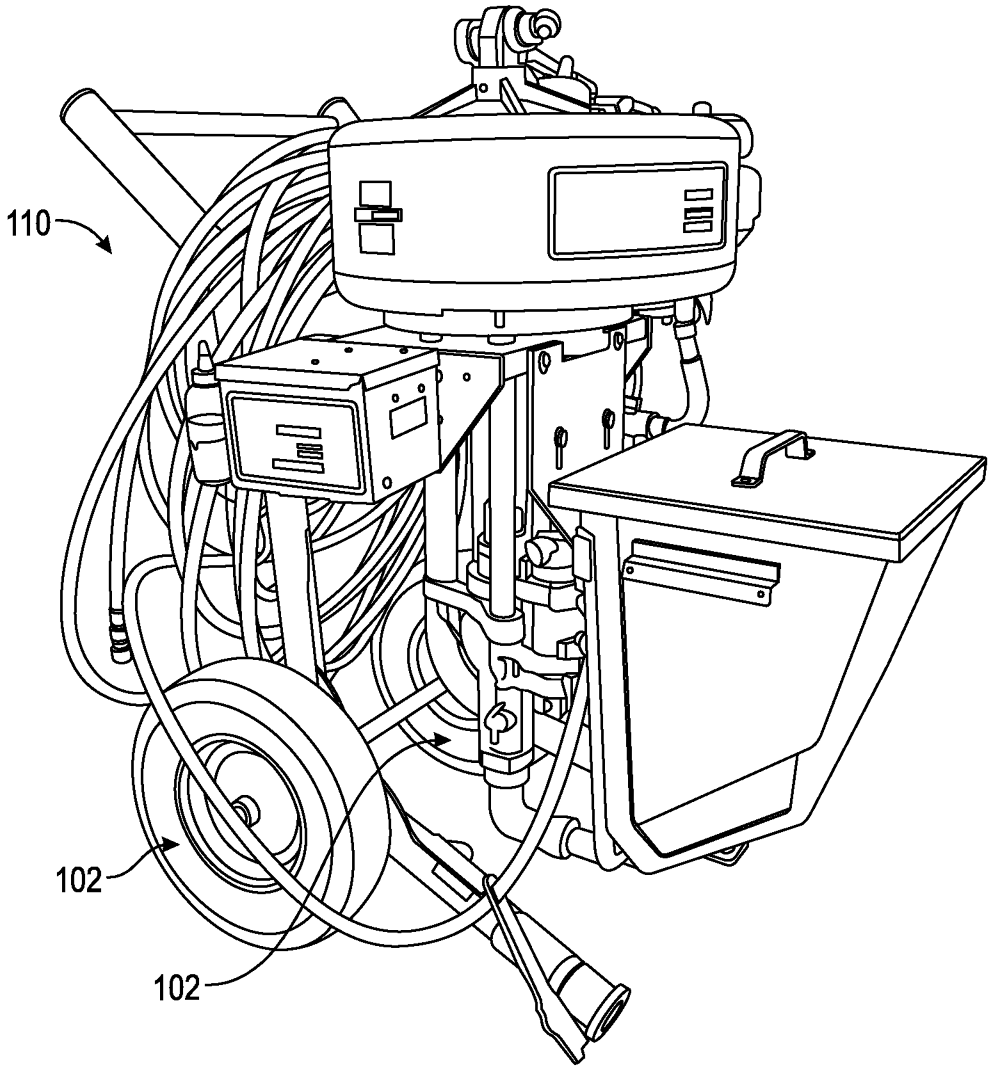
FIG. 2 illustrates a second prior commercial paint sprayer with wheels.
Figure 3:
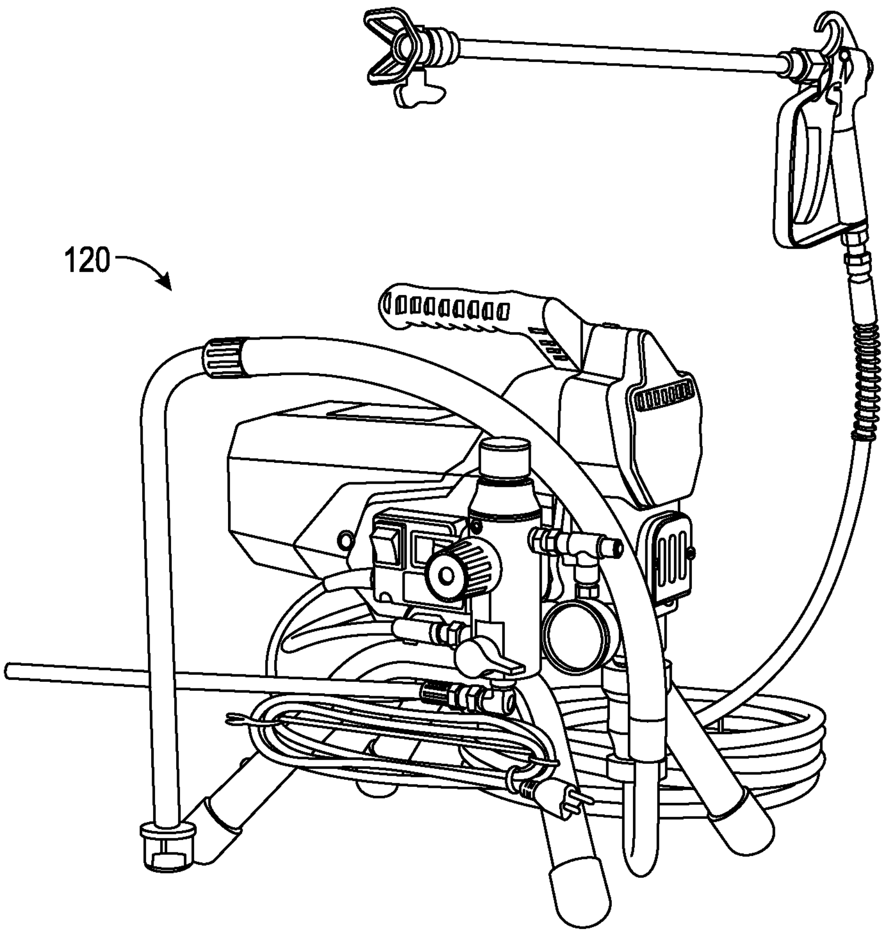
FIG. 3 illustrates a third prior commercial paint sprayer without wheels.

FIGS. 1 and 2 show prior art mobile paint sprayers 100 and 110, respectively. Each of the mobile paint sprayers 100, 110 includes a pair of wheels 101, 102, respectively. FIG. 3 shows a paint sprayer 120 without wheels. In one embodiment, as detailed below, the system herein may be modified to operate with paint sprayers without wheels.

Figure 4:
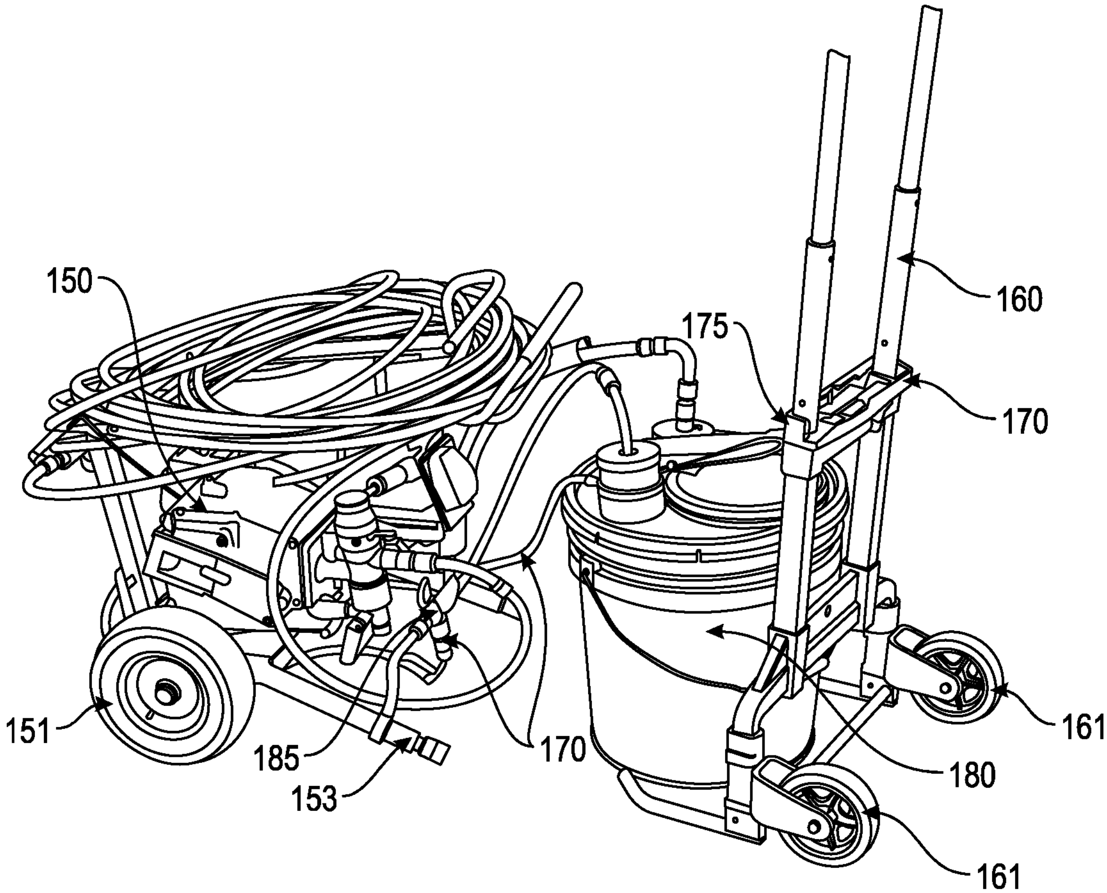
FIG. 4 illustrates an upper perspective view of a commercial paint sprayer and bucket transport apparatus according to the embodiments of the present invention.

FIG. 4 shows an upper perspective view of the commercial paint sprayer 150 and bucket transport apparatus 160.

The bucket transport apparatus 160 is configured to lift and move a 5 gallon bucket of paint. In one embodiment, the bucket transport apparatus 160 is a dolly comprising a lifting blade and a pair of wheels. Other wheeled apparatuses may serve as the bucket transport apparatus 160. The paint sprayer 150 includes wheels 151 and the bucket transport apparatus 160 includes wheels 161. A strap 170 extends between the bucket transport apparatus 160 and paint sprayer 150 movably joining the bucket transport apparatus 160 and paint sprayer 150 to one another. As shown, the strap 170 is secured to the bucket transport apparatus 160 at a point above 175 a point 185 where the strap 170 is secured to the paint sprayer 150. In one embodiment, the strap 170 is attached to a frame of the paint sprayer 150. Ideally, when attached, the strap 170 is taut between the bucket transport apparatus 160 and paint sprayer 150. In this manner, as the bucket transport apparatus 160 is tilted back on wheels 161, the strap 170 serves to lift a front portion of the paint sprayer 150 off of stands 153 or legs, such that like the bucket transport apparatus 160, the paint sprayer 150 tilts back on wheels 151.

Figure 5:
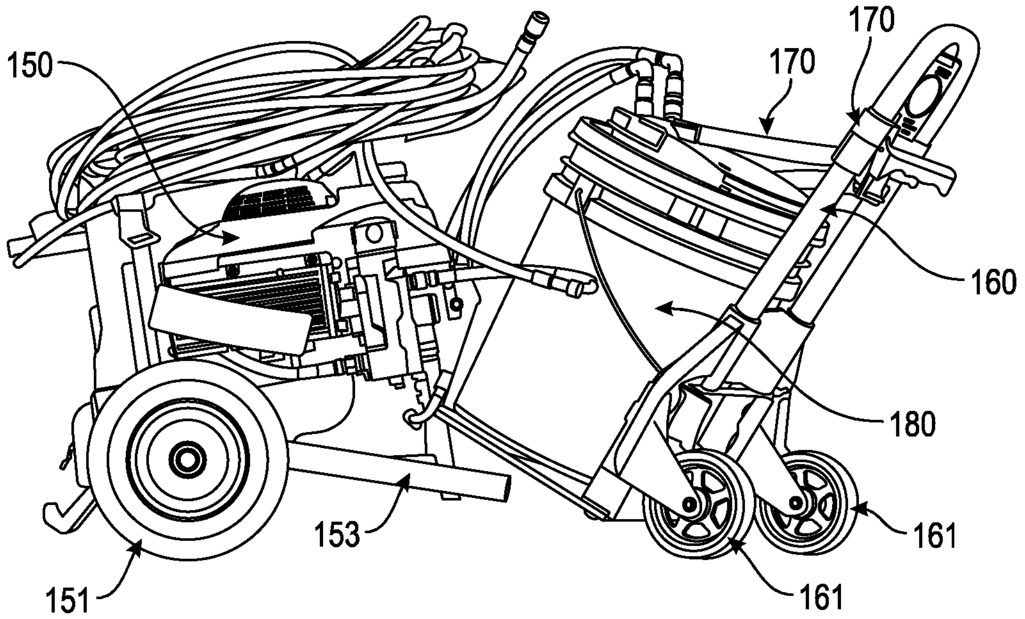
FIG. 5 illustrates a side view of the commercial paint sprayer and bucket transport apparatus according to the embodiments of the present invention.

FIG. 5 shows a side view of the paint sprayer 150 and bucket transport apparatus 160 with the bucket transport apparatus 160 tilted back causing the front portion of the paint sprayer 150 to tilt back so that the paint sprayer rests on its wheels 151. As the bucket transport apparatus 160 tilts back, the bucket 180 is lifted off the ground along with the front portion of the paint sprayer 150 off stand 153 so that the paint sprayer 150 is fully supported by wheels 151. At this stage, the joined paint sprayer 150 and bucket transport apparatus 160 are fully supported by wheels 151, 161. In such a configuration, the paint sprayer 150 and bucket transport apparatus 160 combination may be moved using the bucket transport apparatus 160.

Figure 6:
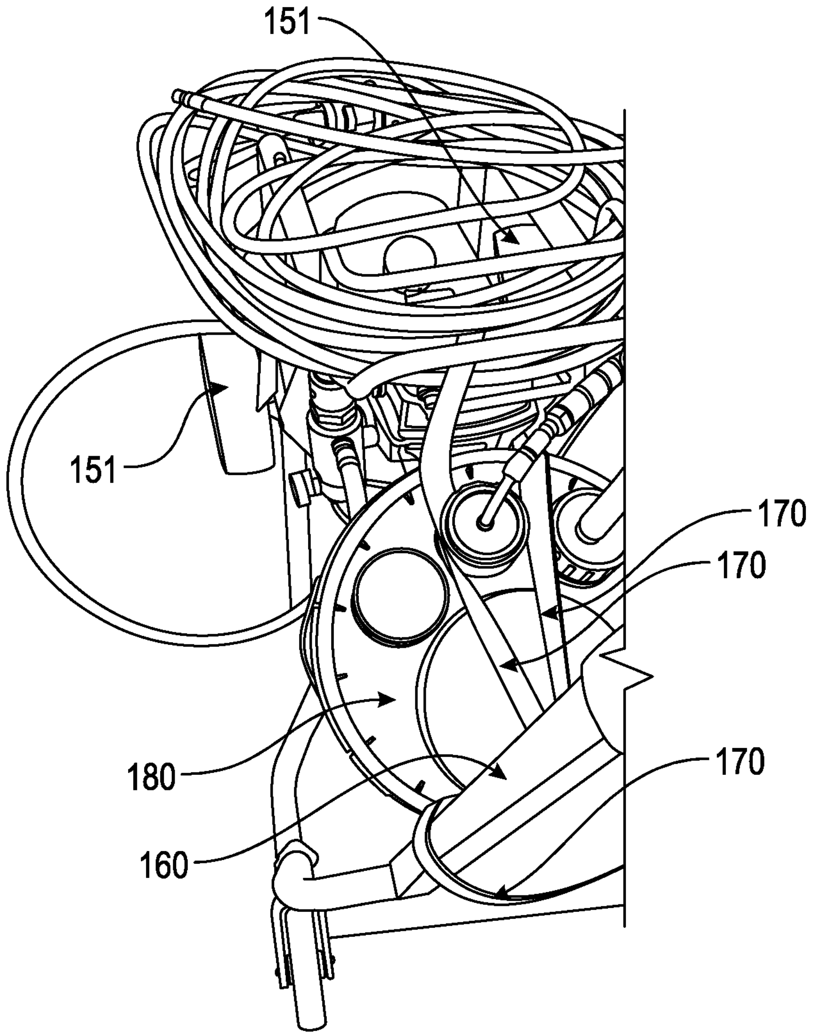
FIG. 6 illustrates a first top down view of the commercial paint sprayer and bucket transport apparatus flat on the ground according to the embodiments of the present invention.

FIG. 6 shows a first top down view of the paint sprayer 150 and bucket transport apparatus 160 with the bucket transport apparatus 160 flat on the ground with the paint bucket 180 78 in place and the strap 170 joining the paint sprayer 150 and bucket transport apparatus 160.

Figure 7:
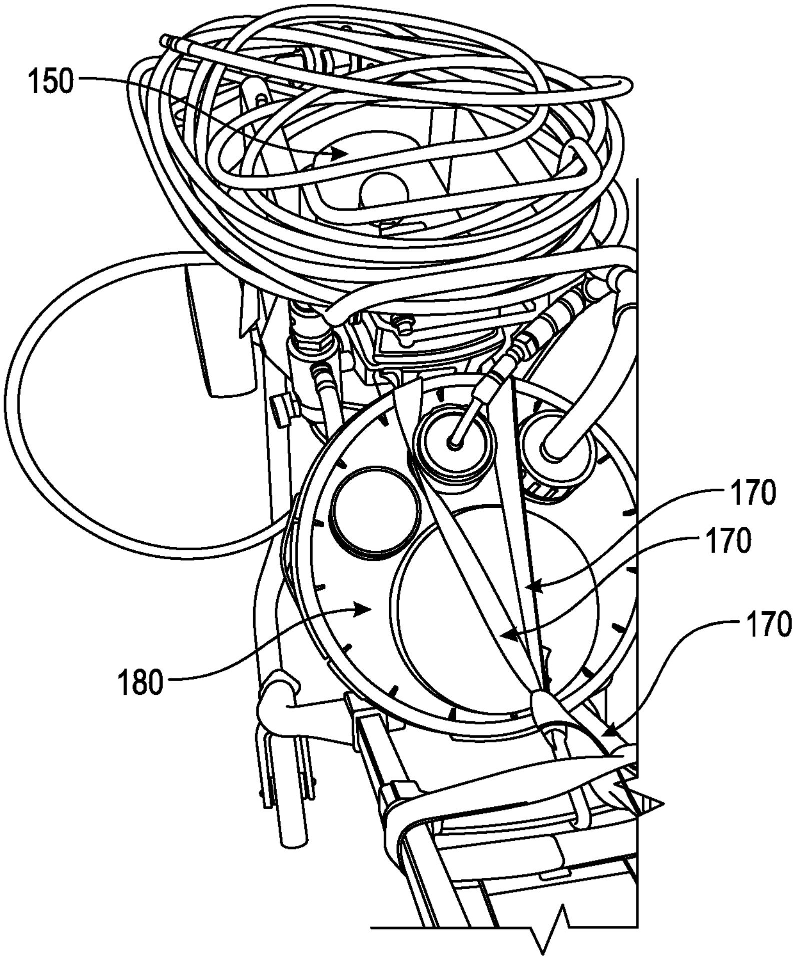
FIG. 7 illustrates a second top down view of the commercial paint sprayer and bucket transport apparatus being tilted back slightly according to the embodiments of the present invention.

FIG. 7 shows a second top down view of the paint sprayer 150 and bucket transport apparatus 160 with the bucket transport apparatus 160 being tilted slightly back causing the front portion of the paint sprayer 150 to begin tilting back. As the bucket transport apparatus 160 is being tilted back, the bucket 180 is being lifted off the ground along with the front portion of the paint sprayer 150 so that the paint sprayer 150 is fully supported by wheels 151. At this stage, the joined paint sprayer 150 and bucket transport apparatus 160 are moving to being fully supported by wheels 151, 161, respectively.

Figure 8:
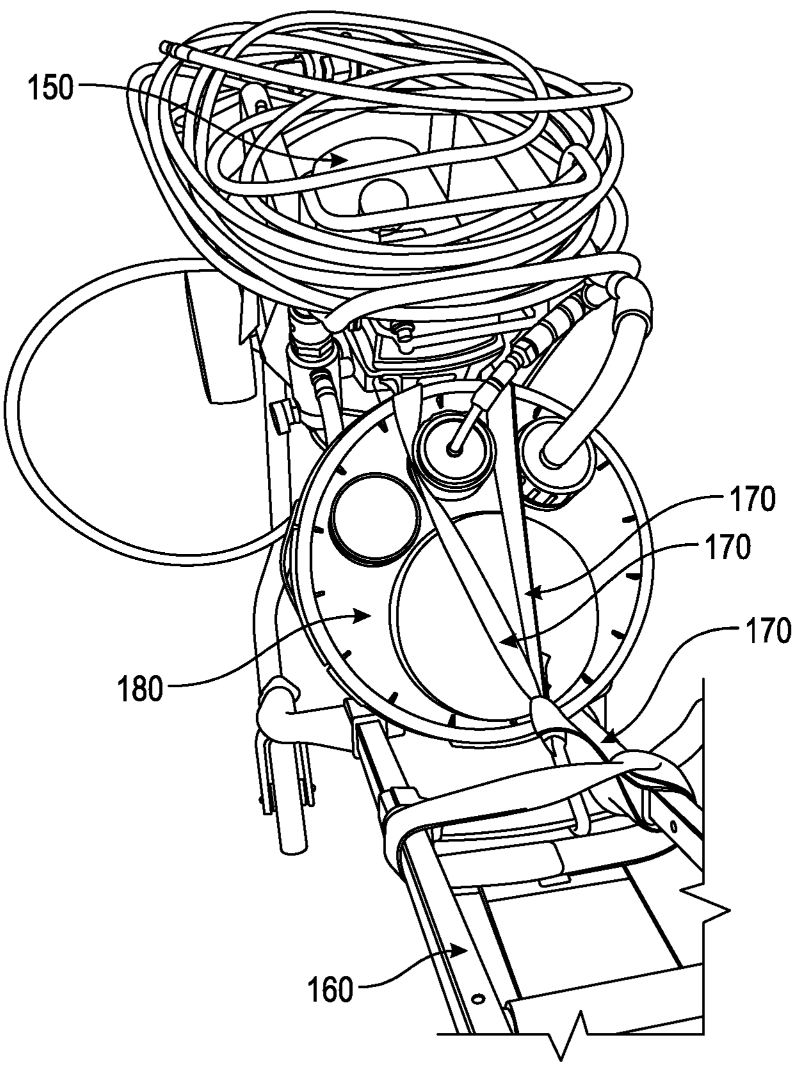
FIG. 8 illustrates a third top down view of the commercial paint sprayer and bucket transport apparatus being titled back fully according to the embodiments of the present invention.
Figure 9:
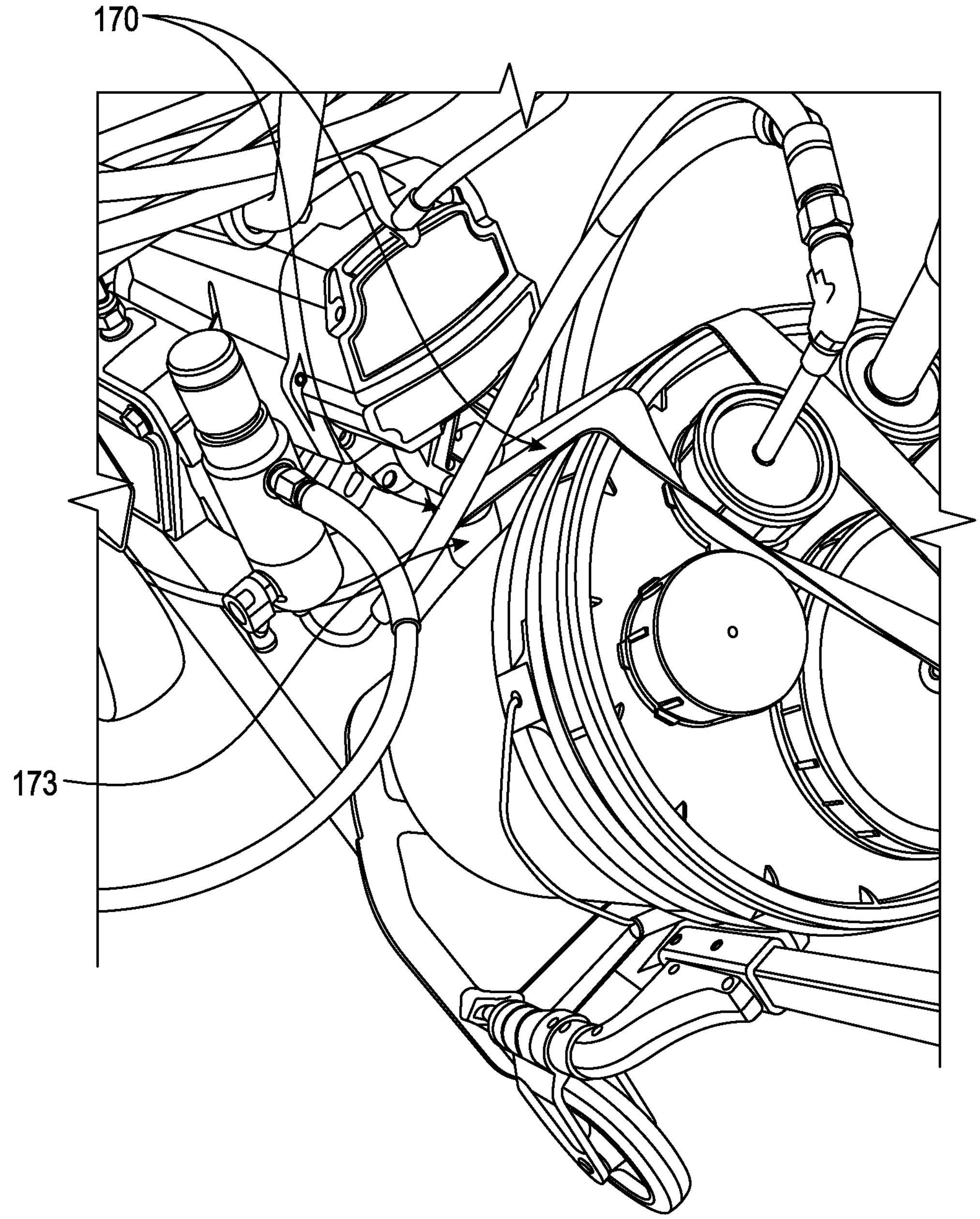
FIG. 9 illustrates a fourth top down view of the commercial paint sprayer and bucket transport apparatus being titled back fully according to the embodiments of the present invention.

FIG. 8 shows a third top down view of the paint sprayer 150 and bucket transport apparatus 160 with the bucket transport apparatus 160 being tilted fully back causing the front portion (i.e., stand 153) of the paint sprayer 150 to lift completely off the ground. As the bucket transport apparatus 160 is fully tilted back, the joined paint sprayer 150 and bucket transport apparatus 160 are fully supported by wheels 151, 161, respectively. FIG. 9 shows a fourth top down view of the paint sprayer 150 and bucket transport apparatus 160. FIG. 9 shows the strap 170 wrapped about a central support leg 173 of the paint sprayer 150.

Figure 10:
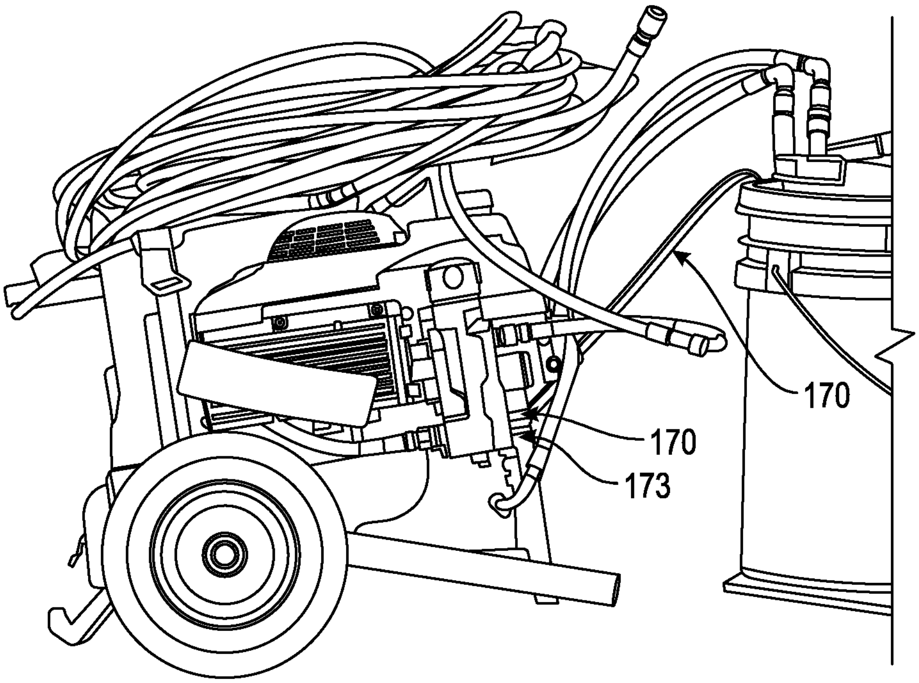
FIG. 10 illustrates a side view of the commercial paint sprayer and bucket transport apparatus being titled back fully according to the embodiments of the present invention.

FIG. 10 shows a side view of the paint sprayer 150 and bucket transport apparatus 160 with the bucket transport apparatus 160 being tilted fully back causing the front portion of the paint sprayer 150 to lift off the ground. FIG. 10 shows the strap 170 wrapped about a central support leg 173 of the paint sprayer 150. Keeping the strap 170 about a center portion of the paint sprayer 150 maintains the paint sprayer 150 stable and firmly on both wheels 151.

Figure 11:
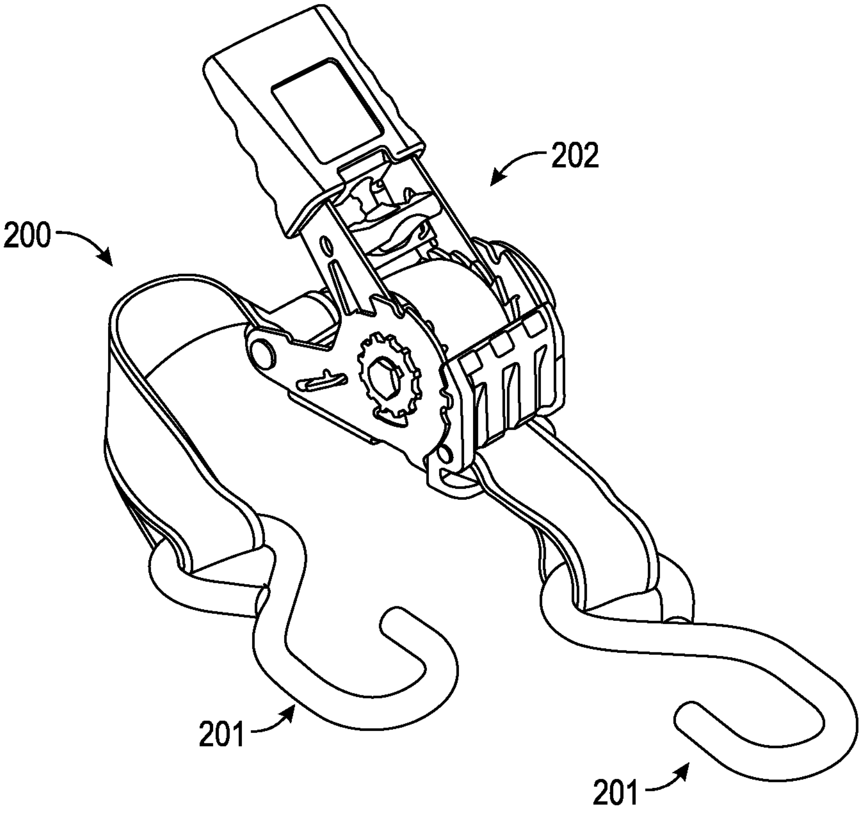
FIG. 11 illustrates an alternative strap of the type suitable for use with the system detailed herein according to the embodiments of the present invention.

FIG. 11 shows an alternative strap 200 of the type that may be used to join the paint sprayer 150 and bucket transport apparatus 160. Strap 200 includes hooks 201 and a ratchet 202 for tightening the straps 200 when connected to both the paint sprayer 150 and bucket transport apparatus 160. A strap without the ratchet and only hooks at each end is also suitable to join the paint sprayer 150 and bucket transport apparatus 160. Indeed, ropes, cables, belts and the lie may be used.

Figure 12A:
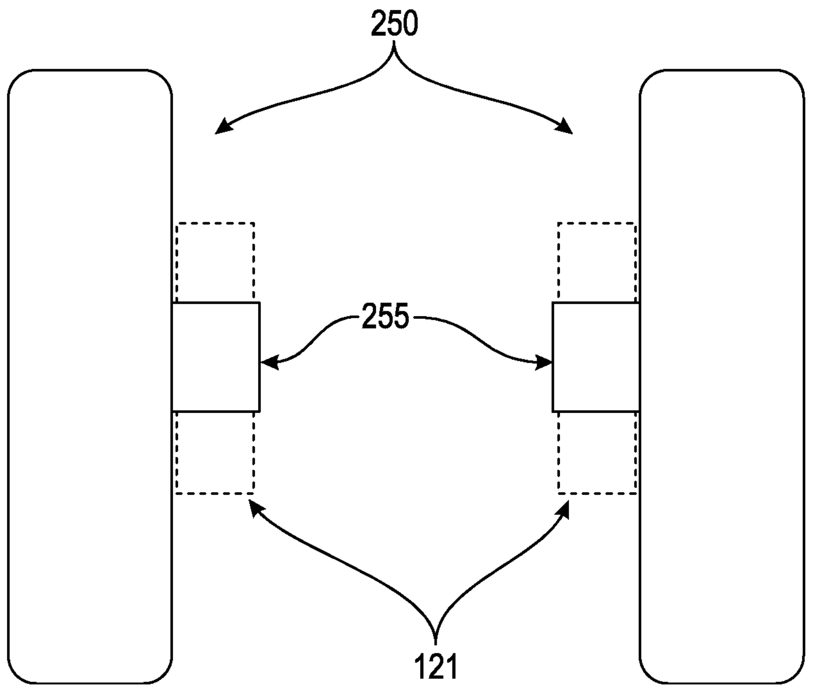
FIG. 12A illustrates a front view of a pair of clip on wheels according to the embodiments of the present invention.
Figure 12B:
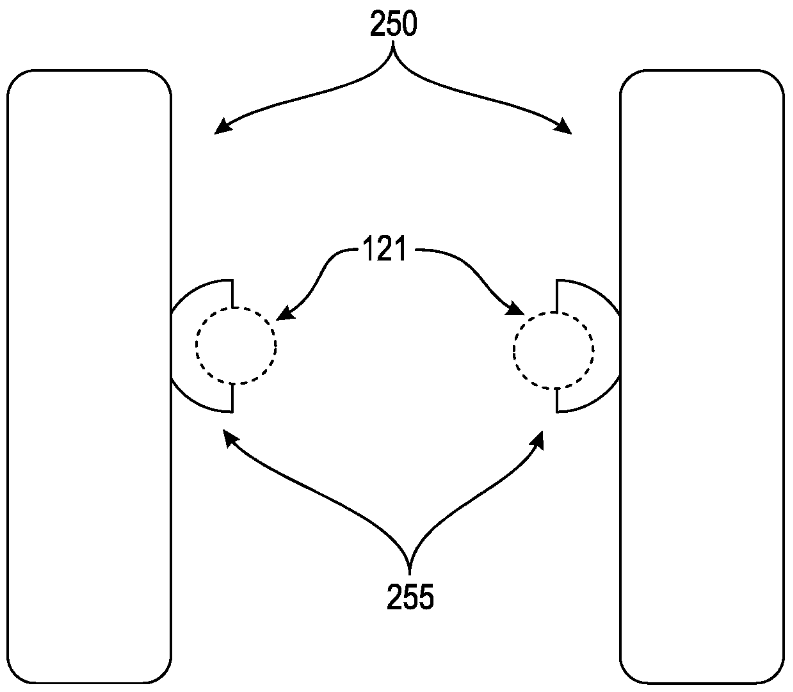
FIG. 12B illustrates a top down view of a pair of clip on wheels according to the embodiments of the present invention.

In an embodiment involving a paint sprayer 120 without wheels (shown in FIG. 3), the system herein includes, as shown in the front view of FIG. 12A and a top down view of FIG. 12B, a pair of wheels 250 configured to attach to the rear legs 121, stands or other supports of the paint sprayer 120. Clips 255 serve to attach to the rear legs 121 of the paint sprayer 120. Once the paint sprayer 120 is moved, the wheels 250 may be removed. Those skilled in the art will recognize that other clips, or other fasteners may be used to connect the wheels to the legs or stands of a paint sprayer.

Although the invention has been described in detail with reference to several embodiments, additional variations and modifications exist within the scope and spirit of the invention as described and defined in the following claims.

I claim:

1. A system for transporting a paint sprayer having two paint sprayer wheels, comprising:

a bucket transport apparatus configured to lift at least a 5-gallon bucket of paint, said bucket transport apparatus having two or more bucket transport apparatus wheels;

a strap, said strap attached at a first end to said bucket transport apparatus and at a second end to said paint sprayer; and wherein attachment points of said strap to said bucket transport apparatus and said paint sprayer cause a front portion of said paint sprayer to lift when said bucket transport apparatus is tilted back about said two or more bucket transport apparatus wheels such that said paint sprayer is supported by said two paint sprayer wheels allowing said bucket transport apparatus to move said paint sprayer on said two paint sprayer wheels.

2. The system of claim 1 wherein said strap is tied to said bucket transport apparatus and said paint sprayer.

3. The system of claim 1 wherein said strap includes hooks at both ends.

4. The system of claim 3 wherein said strap is hooked to said bucket transport apparatus and said paint sprayer.

5. The system of claim 1 wherein said wherein the attachment point of said strap to said bucket transport apparatus is above the attachment of said strap to said paint sprayer.

6. The system of claim 1 wherein said strap is taut when a first end is attached to said bucket transport apparatus and a second end is attached to said paint sprayer.

7. The system of claim 1 wherein said strap includes a ratchet configured to tighten said strap when attached to said bucket transport apparatus and said paint sprayer.

8. A system for transporting a paint sprayer having no integral wheels, comprising:

a bucket transport apparatus configured to lift at least a 5-gallon bucket of paint, said bucket transport apparatus having two or more bucket transport apparatus wheels;

two removably attachable wheels configured to attach to a portion of said paint sprayer;

a strap, said strap attached at a first end to said bucket transport apparatus and at a second end to said paint sprayer; and wherein attachment points of said strap to said bucket transport apparatus and said paint sprayer cause a front portion of said paint sprayer to lift when said bucket transport apparatus is tilted back about said two or more bucket transport apparatus wheels such that said paint sprayer is supported by said two removably attachable wheels attached to said paint sprayer allowing said bucket transport apparatus to move said paint sprayer on said two removably attachable wheels attached to said paint sprayer.

9. The system of claim 8 wherein said strap is tied to said bucket transport apparatus and said paint sprayer.

10. The system of claim 8 wherein said strap includes hooks at both ends.

11. The system of claim 10 wherein said strap is hooked to said bucket transport apparatus and said paint sprayer.

12. The system of claim 8 wherein said wherein the attachment point of said strap to said bucket transport apparatus is above the attachment of said strap to said paint sprayer.

13. The system of claim 8 wherein said strap is taut when a first end is attached to said bucket transport apparatus and a second end is attached to said paint sprayer.

14. The system of claim 8 wherein said strap includes a ratchet configured to tighten said strap when attached to said bucket transport apparatus and said paint sprayer.

15. A method for transporting a paint sprayer having two paint sprayer wheels, comprising:

attaching a strap at a first end to a bucket transport apparatus configured to lift at least a 5-gallon bucket of paint, said bucket transport apparatus having two or more bucket transport apparatus wheels;

attaching a second end of said trap to said paint sprayer such that an attachment point of said strap on said paint sprayer is below an attachment point of said strap on said bucket transport apparatus;

tightening said strap until said strap is taut;

tilting said bucket transport apparatus rearward about said two or more bucket transport apparatus wheels such that said strap lifts a front portion of said paint sprayer whereby said paint sprayer is supported on said two paint sprayer wheels; and pushing and/or pulling said bucket transport apparatus to move said paint sprayer.

16. The method of claim 15 further comprising tying said strap to said bucket transport apparatus and said paint sprayer.

17. The method of claim 15 further comprising hooking said strap to said bucket transport apparatus and said paint sprayer.

18. The method of claim 15 further comprising tightening said strap using a ratchet attached to said strap.

19. A method for transporting a paint sprayer having no integral wheels, comprising:

attaching two wheels to said paint sprayer;

attaching a strap at a first end to a bucket transport apparatus configured to lift at least a 5-gallon bucket of paint, said bucket transport apparatus having two or more bucket transport apparatus wheels;

attaching a second end of said trap to said paint sprayer such that an attachment point of said strap on said paint sprayer is below an attachment point of said strap on said bucket transport apparatus;

tightening said strap until said strap is taut;

tilting said bucket transport apparatus rearward about said two or more bucket transport apparatus wheels such that said strap lifts a front portion of said paint sprayer whereby said paint sprayer is supported on said two wheels attached to said paint sprayer; and pushing and/or pulling said bucket transport apparatus to move said paint sprayer.

20. The method of claim 19 further comprising tying said strap to said bucket transport apparatus and said paint sprayer.

21. The method of claim 19 further comprising hooking said strap to said bucket transport apparatus and said paint sprayer.

22. The method of claim 19 further comprising tightening said strap using a ratchet attached to said strap.

* * * * *